(12) United States Patent
Marchitto

(10) Patent No.: US 8,395,293 B2
(45) Date of Patent: Mar. 12, 2013

(54) PERMANENT MAGNET ROTOR

(75) Inventor: Luciano Marchitto, Pianezza (IT)

(73) Assignee: Gate S.R.L., Turin (IT)

( * ) Notice: Subject to any disclaimer, the term of this patent is extended or adjusted under 35 U.S.C. 154(b) by 241 days.

(21) Appl. No.: 13/007,174

(22) Filed: Jan. 14, 2011

(65) Prior Publication Data

US 2011/0187210 A1    Aug. 4, 2011

(30) Foreign Application Priority Data

Jan. 15, 2010 (IT) .............................. TO2010A0024

(51) Int. Cl.
*H02K 21/12* (2006.01)

(52) U.S. Cl. ..................................... 310/156.26; 310/89
(58) Field of Classification Search ..................... 310/43, 310/89, 156.26, 74
See application file for complete search history.

(56) References Cited

U.S. PATENT DOCUMENTS

| | | | | |
|---|---|---|---|---|
| 3,652,883 | A * | 3/1972 | Cone | 310/74 |
| 3,778,651 | A * | 12/1973 | Cone | 310/74 |
| 4,417,167 | A * | 11/1983 | Ishii et al. | 310/67 R |
| 6,333,576 | B1 * | 12/2001 | Ishikawa et al. | 310/85 |
| 6,944,929 | B2 * | 9/2005 | Ogawa et al. | 29/458 |
| 2004/0263009 | A1 * | 12/2004 | Noda et al. | 310/71 |
| 2007/0252465 | A1 * | 11/2007 | Sasaki et al. | 310/156.26 |
| 2010/0264758 | A1 * | 10/2010 | Strohm et al. | 310/43 |
| 2011/0175479 | A1 * | 7/2011 | Marchitto et al. | 310/156.01 |

* cited by examiner

*Primary Examiner* — Thanh Lam
(74) *Attorney, Agent, or Firm* — Muncy, Geissler, Olds & Lowe, PLLC

(57) ABSTRACT

A permanent magnet rotor for an brushless electric motor of the kind having an internal stator, has a supporting structure made of molded plastic that includes an essentially disc-shaped portion to which a shaft is centrally connected. The periphery of the disc is joined to an essentially cylindrical cage portion which extends coaxially around the shaft. A plurality of magnetically conductive yokes are disposed in the cage portion. The yokes are shaped as ring segments which as a whole form an essentially cylindrical wall. A plurality of ring segment permanent magnets are each disposed astride the junction of a pair of adjacent yokes. Each yoke has a dimension which increases from the circumferential ends thereof towards its circumferentially intermediate portion, such that the cross-sectional area of the yoke in a radial plane correspondingly increases from the ends thereof towards its intermediate portion.

8 Claims, 3 Drawing Sheets

PERMANENT MAGNET ROTOR

CROSS REFERENCE TO RELATED APPLICATIONS

This non-provisional patent application claims priority under 35 U.S.C. §119(a) from Patent Application No. TO2010A000024 filed in Italy on Jan. 15, 2010.

FIELD OF THE INVENTION

This invention relates to a permanent magnet rotor for an electric brushless D.C. motor of the kind having an internal stator.

BACKGROUND OF THE INVENTION

More specifically the invention relates to a rotor having a carrier structure of molded plastic that includes an essentially disc-shaped portion to which a shaft is centrally connected, and the periphery of which is joined to an essentially cylindrical cage portion which extends coaxially around the shaft and in which there are mounted: a plurality of yokes made of a magnetically conducting material and shaped as ring segments which as a whole form an essentially cylindrical wall, and a plurality of permanent magnets, likewise shaped as ring segments, disposed each astride the junction of a pair of adjacent yokes.

It is a desire of the present invention to provide a rotor of this kind that is simple and cheap to manufacture, weighs little, has improved magnetic efficiency, and has reduced manufacturing tolerances.

SUMMARY OF THE INVENTION

Accordingly, in one aspect thereof, the present invention provides a permanent magnet rotor for a brushless electric motor of the kind having an internal stator, the rotor comprising a supporting structure made of molded plastic that includes an essentially disc-shaped portion to which a shaft is centrally connected, and the periphery of which is joined to an essentially cylindrical cage portion which extends coaxially around the shaft and in which there are disposed a plurality of yokes made of a magnetically conducting material and shaped as ring segments which as a whole form an essentially cylindrical wall, and a plurality of permanent magnets, likewise shaped as ring segments, respectively disposed astride the junction of a pair of adjacent yokes, wherein each yoke has a dimension which increases from the circumferential ends thereof towards its circumferentially intermediate portion, such that the cross-sectional area of the yoke in a radial plane correspondingly increases from the ends thereof towards its intermediate portion.

Preferably, each yoke has an essentially constant thickness.

Preferably, each yoke is obtained from a planar blank by cold rolling along a direction (A) extending from one end thereof towards the other end thereof.

Alternatively, each yoke has a radial thickness which increases circumferentially from the ends thereof toward its intermediate portion.

Preferably, the supporting structure is made of plastic overmolded onto the central shaft and onto said yokes.

Preferably, each yoke in its middle portion has a bent appendix, incorporated by overmolding in said disc portion of the supporting structure.

Preferably, the cage portion of the supporting structure forms a plurality of struts essentially parallel to the axis of the rotor, and protruding radially inwards, essentially in the middle of the yokes, such that between each pair of adjacent struts there is defined a seat for a corresponding permanent magnet.

According to a second aspect, the present invention provides a brushless electric motor incorporating a rotor as described above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
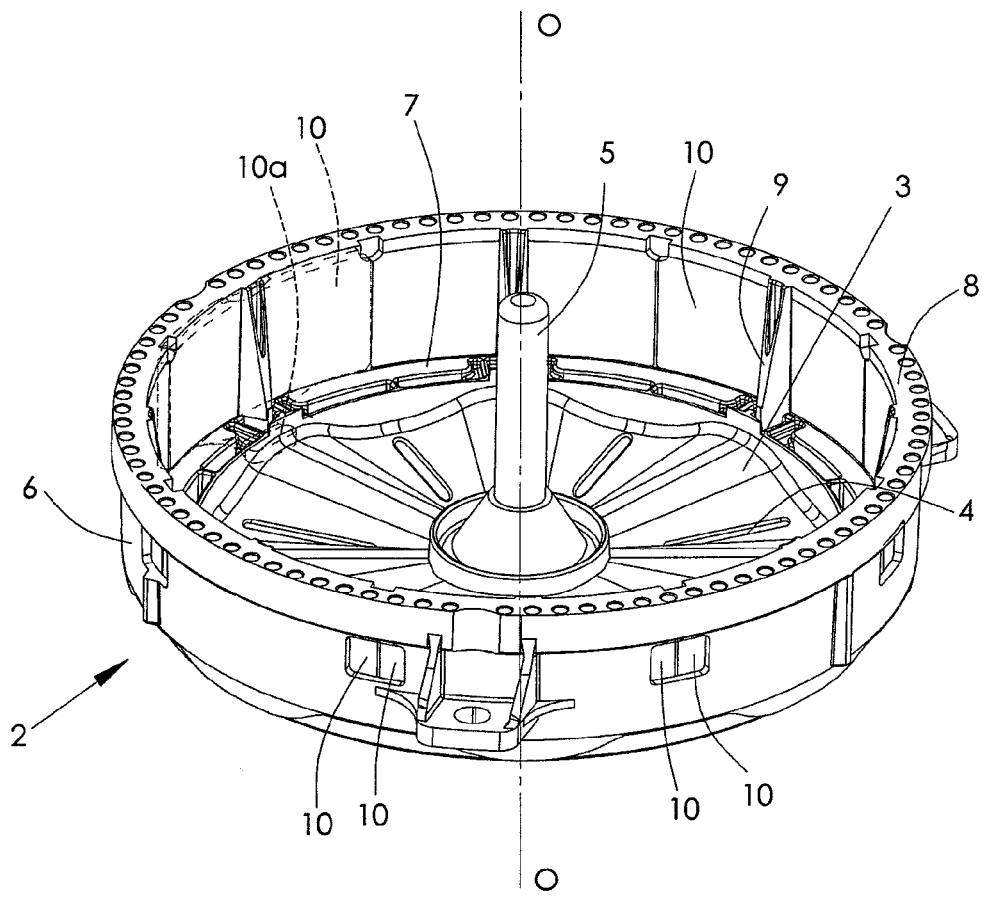
FIG. 1 is a view of a partially complete permanent magnet rotor according to the present invention.
Figure 2:
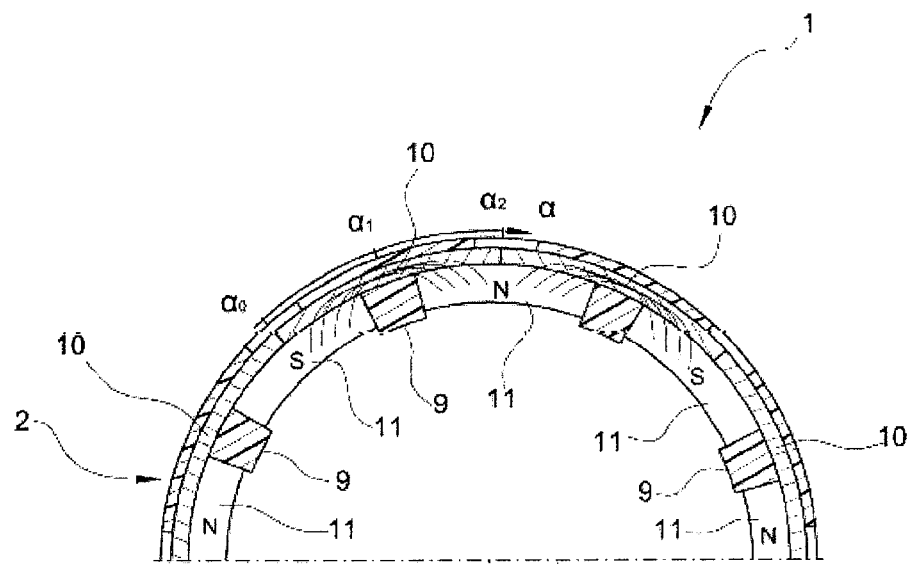
FIG. 2 is a partial diagrammatic cross-section through the permanent magnet rotor of FIG. 1.

In FIGS. 1 and 2, 1 is a general reference for a permanent magnet rotor for an electric brushless D.C. motor of the kind having an internal stator (not shown). Please note that in FIG. 1, the permanent magnets of the permanent magnet rotor have been omitted to show the structure of the rotor.

With particular reference to FIG. 1, the rotor 1 comprises a carrier structure 2 made of molded plastic. This structure 2 includes an essentially disc-shaped portion 3. The carrier structure 2 is overmolded onto a central shaft 5, which extends coaxially from the disc-shaped portion 3. The periphery of the disc-shaped portion 3 is joined to an essentially cylindrical cage portion 6, which extends coaxially around the shaft 5.

In the embodiment depicted, the cage portion 6 of the carrier structure 2 comprises essentially a first ring 7 connected to the periphery of the disc-shaped portion 3, and a second ring 8 connected to the ring 7 by a plurality of struts 9 essentially parallel to the axis O-O of the rotor.

Enclosed in the cage portion 6 of the carrier structure 2 are a plurality of yokes 10 of magnetically conducting material, preferably silicon steel, shaped as ring segments. These yokes are arranged side by side in such a way that together they form an essentially cylindrical wall (see FIG. 2).

The rotor 1 also comprises a plurality of permanent magnets 11 (FIG. 2), also shaped as ring segments, and magnetized in a direction perpendicular to the axis O-O of the rotor 1. The polarities of these magnets in FIG. 2 are marked S ("south") and N ("north"), to indicate the polarity at the surface of the magnet facing the stator. The permanent magnets 11 are mounted in the cage portion 6 of the carrier structure 2, each between two consecutive struts 9, so that each magnet is astride the junction between two adjacent yokes 10.

With reference to FIG. 2, owing to the arrangement described above, a magnetic flux path is formed by each yoke 10. The flux comes from one half of a permanent magnet 11 and flows towards the adjacent half of the next permanent magnet 11. The arrangement is also such that there is a substantial concentration of the flux in the radial cross-sections of each yoke 10 at its circumferentially intermediate portion.

Figure 3:
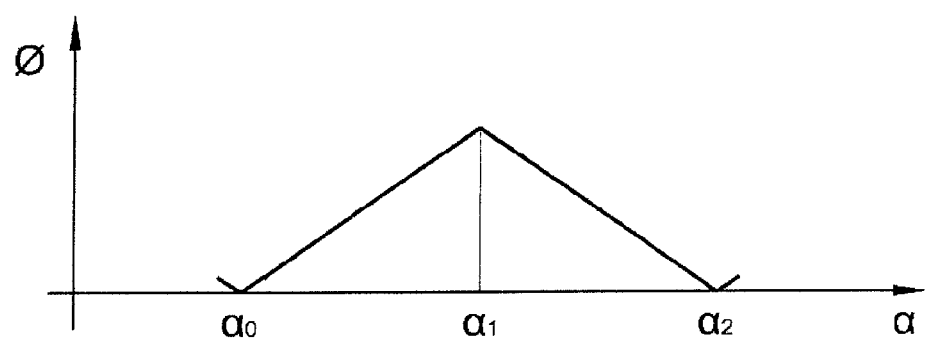
FIG. 3 is a diagram illustrating qualitatively the curve of the strength of the magnetic flux in a yoke of the rotor of FIG. 2.

FIG. 3 shows qualitatively the curve of the magnetic flux φ, shown on the vertical axis, against the angle α on the horizontal axis (see also FIG. 2): the flux φ is greatest in the middle (α1) of the yoke.

The yokes 10 are preferably of essentially constant thickness. Moreover, as seen particularly in FIGS. 1 and 5, each yoke 10 has, parallel to the axis O-O of the rotor 1, a dimension (height) which increases from the ends thereof towards its intermediate portion, such that the cross-sectional area of the yoke in a radial plane correspondingly increases circumferentially from the ends thereof towards said intermediate portion.

Figure 4:
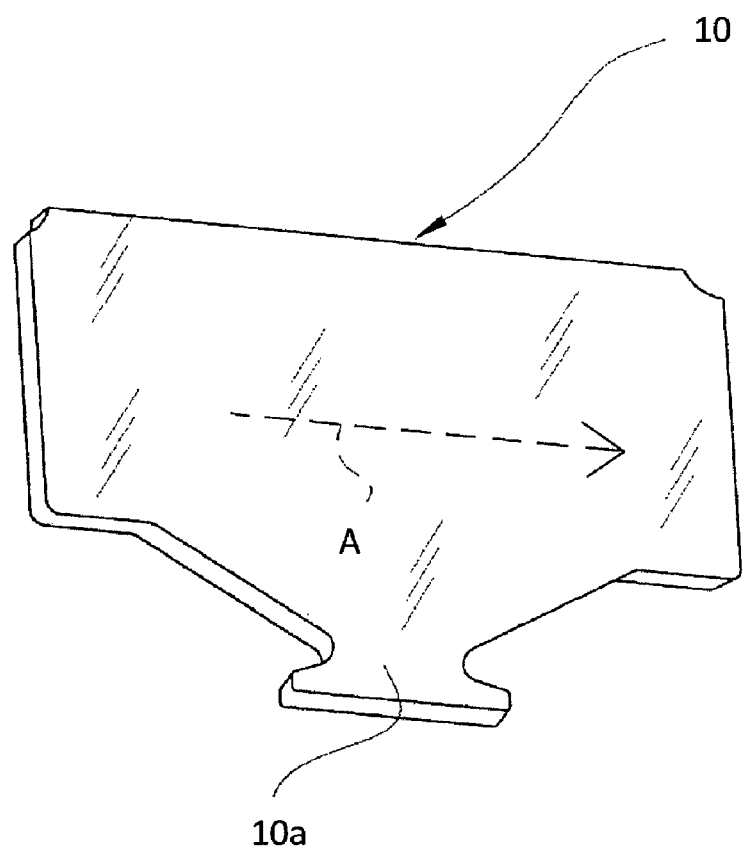
FIG. 4 is a perspective view of a semi-finished part from which a yoke can subsequently be made for the rotor according to the present invention.

Advantageously, each yoke 10 is obtained from a planar blank, also marked 10 in FIG. 4, by cold rolling along a direction from one end thereof towards the other, as indicated by the dashed arrow A in FIG. 4. This has the advantage of making it possible to "shape" the magnetic domains appropriately in the yokes, in such a way that the losses in these yokes 10 are appreciably reduced. The incorporation of the yokes 10 in the carrier structure 2 of the rotor by overmolding the plastic makes it possible to achieve greater precision in the positioning of the yokes, avoiding assembly errors which typically occur in the manufacture of mechanically assembled yokes.

Figure 5:
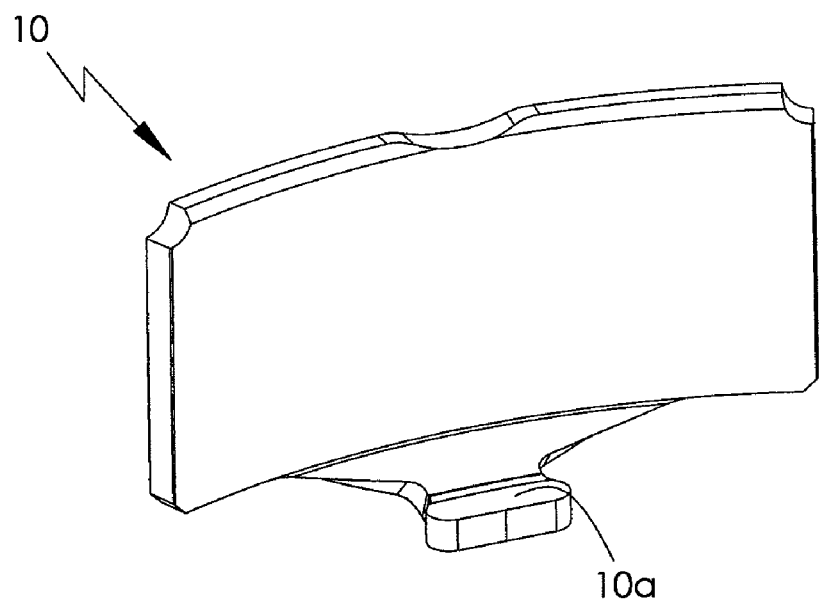
FIG. 5 is a perspective view of a yoke for the rotor of FIG. 1.

With reference to FIGS. 4 and 5, preferably, though not necessarily, each yoke 10 in its middle portion has a transversely bent appendix 10*a*, which is incorporated by overmolding in the disc-shaped portion 3 of the carrier structure 2 (see also FIG. 1).

In an alternative embodiment, not shown in the drawings, each yoke 10 has a radial thickness which increases from the ends thereof towards its intermediate portion.

In another embodiment (not shown), each yoke has both a height and a thickness which increase from the circumferential ends thereof towards its intermediate portion.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet rotor for a brushless electric motor of the kind having an internal stator, the rotor comprising a supporting structure made of molded plastic that includes an essentially disc-shaped portion to which a shaft is centrally connected, and the periphery of which is joined to an essentially cylindrical cage portion which extends coaxially around the shaft and in which there are disposed a plurality of yokes made of a magnetically conducting material and shaped as ring segments which as a whole form an essentially cylindrical wall, and a plurality of permanent magnets, likewise shaped as ring segments, respectively disposed astride the junction of a pair of adjacent yokes, wherein each yoke has a dimension which increases from the circumferential ends thereof towards its circumferentially intermediate portion, such that the cross-sectional area of the yoke in a radial plane correspondingly increases from the ends thereof towards its intermediate portion.

2. The rotor of claim 1, wherein each yoke has an essentially constant thickness.

3. The rotor of claim 2, wherein each yoke is obtained from a planar blank by cold rolling along a direction (A) extending from one end thereof towards the other end thereof.

4. The rotor of claim 1, wherein each yoke has a radial thickness which increases circumferentially from the ends thereof toward its intermediate portion.

5. The rotor of claim 1, wherein said supporting structure is made of plastic overmolded onto the central shaft and onto said yokes.

6. The rotor of claim 5, wherein each yoke in its middle portion has a bent appendix, incorporated by overmolding in said disc portion of the supporting structure.

7. The rotor of claim 1, wherein said cage portion of the supporting structure forms a plurality of struts essentially parallel to the axis of the rotor, and protruding radially inwards, essentially in the middle of the yokes, such that between each pair of adjacent struts there is defined a seat for a corresponding permanent magnet.

8. A brushless electric motor incorporating the rotor of claim 1.

* * * * *